W. HARPER.
Seed and Fertilizer-Distributor.
No. 204,323. Patented May 28, 1878.
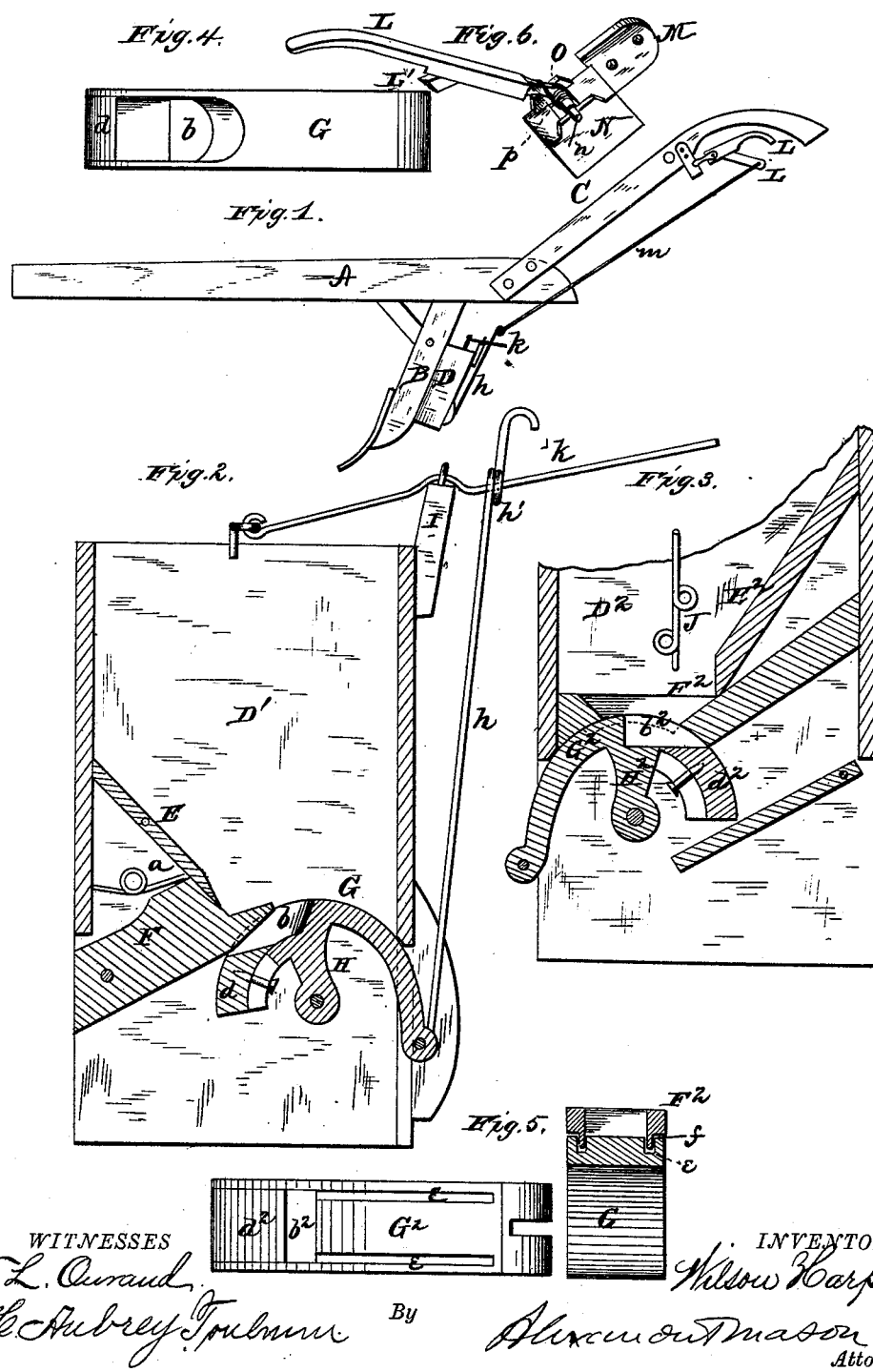

UNITED STATES PATENT OFFICE.

WILSON HARPER, OF FULK'S RUN, VIRGINIA.

IMPROVEMENT IN SEED AND FERTILIZER DISTRIBUTERS.

Specification forming part of Letters Patent No. 204,323, dated May 28, 1878; application filed April 8, 1878.

*To all whom it may concern:*

Be it known that I, WILSON HARPER, of Fulk's Run, in the county of Rockingham, and in the State of Virginia, have invented certain new and useful Improvements in Seed and Fertilizer Distributers; and do hereby declare that the following is a full, clear, and exact description thereof, reference being had to the accompanying drawings, and to the letters of reference marked thereon, making a part of this specification.

The nature of my invention consists in the construction and arrangement of a seed and fertilizer distributer to be used as an attachment for plows, as will be hereinafter more fully set forth.

In order to enable others skilled in the art to which my invention appertains to make and use the same, I will proceed to describe its construction and operation, referring to the annexed drawing, in which—

Figure 1 is a side elevation of a plow embodying my invention. Fig. 2 is a vertical section of the seed-distributer. Fig. 3 is a similar view of the fertilizer-distributer. Figs. 4, 5, and 6 are views of detailed parts of my invention.

A represents a plow-beam, with plow-foot B and handles C C. To the back of the plow-foot B is secured the box D, which, by a vertical partition, is divided into a seed-chamber, $D^1$, and a fertilizer-chamber, $D^2$. In the seed-chamber $D^1$ is an incline, E, below which is pivoted a valve or cut-off, F, pressed against the dropper by a spring, $a$.

The dropper consists of a semicircular rim, G, with an interior radial arm, H, pivoted in the center of the circle to the box, the rim forming the bottom of the chamber $D^1$. In the rim or dropper G is a recess or pocket, $b$, provided with an adjustable slide, $d$, to increase or diminish the size of the pocket, for dropping more or less seed, as may be required.

The fertilizer-chamber $D^2$ has, in like manner, an incline, $E^2$, to conduct the fertilizer to the semicircular dropping-rim $G^2$, which has the radial pivoting-arm $H^2$, pocket or recess $b^2$, and slide $d^2$. This rim $G^2$ has, however, in addition, two parallel grooves, $e\ e$, near its sides, into which fit tongues or ribs $f\ f$ on the bottom $F^2$ of said chamber $D^2$, on each side of the delivery-opening, to prevent the escape of the fertilizer.

In practice, the two droppers G $G^2$ are operated at the same time, dropping the seed and fertilizer simultaneously into the furrow made by the plow. The valve or cut-off F prevents more than the desired quantity of seed from passing, while at the same time it yields sufficiently to prevent the breaking of any grain.

The rear ends of the two droppers G $G^2$ are connected by a rod, $h$, which extends upward, and has a ring, $h'$, formed on it, through which passes a rod, $k$. This rod is pivoted on a standard, I, attached to the box D, and its forward end connects with and operates a stirrer, J, in the fertilizer-chamber $D^2$.

The upper end of the rod $h$ is, by a rod or wire, $m$, connected with an arm, L', extending from the under side of a lever, L. This lever is connected to the plow-handle in the following manner: On the side of the handle is secured a plate, M, the lower portion of which forms a frame, N, lying against the under side of the handle. In this frame is placed a shaft, $n$, having an arm, O, attached to it, one end of said arm being firmly bolted to the lever L, while the other arm forms a stop in the frame. A coil-spring, $p$, is wound around the shaft $n$, and one end thereof works against the arm O, as shown in Fig. 6.

The operator grasps the handle of the plow and the lever L, and draws said lever against the handle. The arm L', by this movement of the lever, causes a rotation of the two droppers G $G^2$ to a certain limit, sufficient to allow them to drop their quota of seed and fertilizer. At the same time the stirrer J is moved. As soon as the pressure is removed from the lever L the spring $p$ returns the parts to their former position.

Having thus fully described my invention, what I claim as new, and desire to secure by Letters Patent, is—

The semicircular dropper $G^2$, provided with the radial pivoting-arm $H^2$, grooves $e\ e$, pocket $b^2$, and slide $d^2$, in combination with the chamber $D^2$, bottom $F^2$, and ribs $f\ f$, all substantially as and for the purposes herein set forth.

In testimony that I claim the foregoing I have hereunto set my hand this 20th day of March, 1878.

WILSON HARPER.

Witnesses:
FRANK GALT,
J. M. MASON.